(12) United States Patent
Barraza Enciso et al.

(10) Patent No.: US 10,997,521 B1
(45) Date of Patent: May 4, 2021

(54) QUANTUM-RESILIENT COMPUTER CLUSTER

(71) Applicant: Bank of America Corporation, Charlotte, NC (US)

(72) Inventors: Maria Carolina Barraza Enciso, New York, NY (US); Elena Kvochko, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 34 days.

(21) Appl. No.: 16/661,006

(22) Filed: Oct. 23, 2019

(51) Int. Cl.
   *G06N 10/00* (2019.01)
   *G06F 7/58* (2006.01)
   (Continued)

(52) U.S. Cl.
   CPC .............. *G06N 10/00* (2019.01); *B82Y 10/00* (2013.01); *G06F 7/588* (2013.01); *H01L 39/221* (2013.01); *H04B 10/70* (2013.01)

(58) Field of Classification Search
   CPC ... H04L 9/0852; H04L 9/0855; H04L 9/0858; H04L 63/062; H04L 9/3263; H04L 2209/08; H04L 2209/16; H04L 2209/38; H04L 2209/60; H04L 2463/062; H04L 63/0435; H04L 63/0442; H04L 63/061; H04L 63/0823; H04L 9/006; H04L 9/083; H04L 9/0838; H04L 9/0844; H04L 9/0891; H04L 9/321; H04L 9/3226; H04L 9/3236;
   (Continued)

(56) References Cited

U.S. PATENT DOCUMENTS 7,178,277 B2   2/2007  Takeuchi
7,577,257 B2   8/2009  Xia et al.
(Continued)

OTHER PUBLICATIONS

Quintessence et al; Quantum Tunneling Away from Cyber Criminals; Apr. 2018; Quintessence Labs; pp. 1-3. (Year: 2018).*
(Continued)

*Primary Examiner* — Amritbir K Sandhu
(74) *Attorney, Agent, or Firm* — Weiss & Arons LLP; Michael A. Springs, Esq.

(57) ABSTRACT

A method for operating a quantum-resilient server-cluster is provided. The server-cluster includes a plurality of servers. Each of the servers may be encapsulated in a selectively-quantum-resilient case. The method may include transmitting a first communication from a first server, included in the server-cluster. The first communication may be intercepted at a first selectively-quantum-resilient case. The method may include identifying, at the first selectively-quantum-resilient case, a recipient of the first communication. When the recipient of the first communication is a server included in the server-cluster, the first case verifies the security of the communication via quantum entanglement, and transmits the communication to the recipient in an encrypted manner via quantum tunneling. When the recipient of the first communication is a server outside of the server-cluster, the first case generates a quantum-resilient random number, encrypts the communication with the generated number and transmits the communication to the recipient via quantum tunneling.

5 Claims, 3 Drawing Sheets

(51) Int. Cl.
  *B82Y 10/00* (2011.01)
  *H01L 39/22* (2006.01)
  *H04B 10/70* (2013.01)

(58) Field of Classification Search
  CPC ....... H04W 12/0401; H04W 12/04031; H04W 12/04033; H04W 88/08; G06F 21/602; G06F 21/78; G06F 21/6218; G06F 21/64; G06F 2221/2107; G06F 3/0608; G06F 3/0623; G06F 3/067; G06F 7/582; G06F 7/588; G06F 12/1408; G06F 16/137; G06F 21/606; G06F 2212/1052; G06F 2212/402; G06F 2221/2131; G06F 3/064; G06F 3/0641; G06F 3/0683; G06F 3/0688; G06N 10/00; B82Y 10/00; H01L 39/221; H04B 10/70
  USPC .... 398/154–156; 380/30, 44, 256, 255, 277, 380/278, 279
  See application file for complete search history.

(56) References Cited

U.S. PATENT DOCUMENTS

| | | | |
|---|---|---|---|
| 7,590,868 B2 | 9/2009 | Musa et al. | |
| 7,697,693 B1* | 4/2010 | Elliott | H04B 10/70 380/278 |
| 7,706,535 B1* | 4/2010 | Pearson | H04L 9/0855 380/255 |
| 7,929,700 B2 | 4/2011 | Lodewyck et al. | |
| 8,340,298 B2 | 12/2012 | Gelfond et al. | |
| 8,483,394 B2 | 7/2013 | Nordholt et al. | |
| 8,582,769 B2 | 11/2013 | Zhao et al. | |
| 8,639,932 B2 | 1/2014 | Wiseman et al. | |
| 8,650,401 B2 | 2/2014 | Wiseman et al. | |
| 8,693,691 B2 | 4/2014 | Jacobs | |
| 8,744,075 B2* | 6/2014 | Tanaka | H04L 9/3263 380/30 |
| 8,897,449 B1* | 11/2014 | Broadbent | H04L 9/0852 380/277 |
| 8,903,094 B2 | 12/2014 | Bovino | |
| 10,127,499 B1* | 11/2018 | Rigetti | G06F 15/16 |
| 10,348,493 B2* | 7/2019 | Fu | H04L 9/0827 |
| 10,644,882 B2* | 5/2020 | Kurian | H04L 9/12 |
| 10,802,800 B1* | 10/2020 | Vakili | H04L 9/083 |
| 2011/0182428 A1* | 7/2011 | Zhao | H04L 9/0852 380/256 |
| 2011/0317836 A1* | 12/2011 | Yeh | H04L 9/12 380/256 |
| 2014/0068765 A1* | 3/2014 | Choi | H04L 63/1416 726/23 |
| 2014/0355998 A1* | 12/2014 | Tanzilli | H04L 9/0852 398/141 |
| 2017/0063827 A1* | 3/2017 | Ricardo | H04L 63/083 |
| 2018/0089733 A1* | 3/2018 | Huang | G06Q 30/0611 |
| 2018/0240032 A1* | 8/2018 | van Rooyen | G16B 20/00 |
| 2018/0309785 A1* | 10/2018 | Kurian | H04L 63/1466 |
| 2019/0026234 A1* | 1/2019 | Harnik | H04L 63/0853 |
| 2019/0097792 A1* | 3/2019 | Howe | H04L 1/0045 |
| 2019/0322298 A1* | 10/2019 | Mong | H04L 67/12 |
| 2020/0043007 A1* | 2/2020 | Simons | G06Q 20/4016 |
| 2020/0304292 A1* | 9/2020 | Mochalov | H04L 9/0861 |

OTHER PUBLICATIONS

Quintessence et al; Quantum tunneling Away from Cyber Criminals; Feb. 2018; Quintessence Labs. (Year: 2018).*
"Server Farm," https://en.wikipedia.org/wiki/Server_farm, Wikimedia Foundation, Inc., Aug. 5, 2019.
Eric Bland, "Entangled Particles Face Sudden Death," http://www.abc.net.au/science/articles/2009/02/02/2478343.htm, ABC Science, Feb. 2, 2009.
"Computer Cluster," https://en.wikipedia.org/wiki/Computer_cluster, Wikimedia Foundation, Inc., Sep. 1, 2019.
Asher Peres, "Quantum Disentanglement and Computation," https://arxiv.org/pdf/quant-ph/9707047.pdf, Technion-Israel Institute of Technology, Jul. 24, 1997.
"What is a Farm, as Opposed to a Grid or a Cluster?" https://stackoverflow.com/questions/20466842/what-is-a-farm-as-opposed-to-a-grid-or-a-cluster, Stack Exchange Inc., Dec. 9, 2013.

* cited by examiner

QUANTUM-RESILIENT COMPUTER CLUSTER

FIELD OF TECHNOLOGY

This disclosure relates to computer clusters. Specifically, this disclosure relates to harnessing the power of quantum computing to harden the security of computer clusters.

BACKGROUND

Since the beginning of the computer era, computers have evolved from punch-card machines to the advanced computers of today. Moore's law teaches the principle that the speed and capability of computers can be expected to double every two years. This increase is a result of increases in the number of transistors contained by a microchip. Therefore, a 2019 smartphone may have more computing power than a 1960 mainframe.

Industrial entities may require greater computing power than a typical personal computer ("PC"). Industrial entities may also require greater computing throughput than a typical PC. Computing throughput may be understood to mean the rate at which work is processed. A number of variations are available for computers with greater computing power. These variations may include mainframe computers, supercomputers, computer farms and computer clusters. It should be appreciated that the difference between mainframes, supercomputers, computer farms and computer clusters may not always be clear. Therefore, at times, a computer can be correctly classified in multiple classification categories.

Mainframe computers may be a variation of high-speed computers with large amounts of computing power. Mainframe computers are typically characterized as single unit, high-speed computers. Many mainframe computers may support numerous workstations or peripherals.

Mainframes may support a large number of simultaneous transactions and massive input/output and throughput without reducing computing speed. Specifically, mainframes may process terabytes of data in a short time.

Mainframes may maintain peak performance rates when the actual processing load is up to ninety percent (90%) of the total processing load. These performance rates are considerably better than the performance rates of standard computers that use standard processors. Standard computers that use standard processors, such as x86 (nomenclature for Intel® processors that have been released after the original 8086 processor) processors, or ARM (Advanced RISC (Reduced Instruction Set Computing) Machine) processors, may lose efficiency when the actual processing load is greater than twenty percent (20%) of the total processing load.

Mainframe operations may efficiently utilize resources. Specifically, in-box communications may enable efficient resource utilization. Mainframe resource utilization may be more efficient than standard server resource utilization. This increase in efficiency may result because mainframes utilize in-box communications, while standard servers, using typical processors, such as x86 and ARM, are limited by network communications.

Mainframe computers are usually specialty systems with custom operating systems. These specialty systems usually serve a specific, limited purpose. Such a purpose may include calculations, transaction processing, commercial exchange of goods, services and/or money.

There may be disadvantages to mainframe computers. Mainframes are very expensive and highly customized with custom operating systems. Therefore, mainframes are typically not flexible. Additionally, mainframes may require large amounts of resources to configure the customized systems and maintain the customized systems. For these reasons, among others, mainframe acquisition may be mostly limited to organizations that have specific processing needs.

A mainframe system may also provide a single point of failure to a system in which only one mainframe is operational. The single point of failure may result because all of the operations, including processing and input/output, are performed at a single location. As such, if a mainframe incurs a scheduled or unscheduled failure, the system may become out of service. Therefore, many organizations that operate with mainframes have a resilience plan. The resilience plan may include one or more additional mainframes that are available for backup in the event of a scheduled or unscheduled failure. In order for the backup to operate, the primary mainframe should be in continuous communication with the one or more additional mainframes. The communication may provide the ability to transfer a copy of the data included in the primary mainframe to the one or more additional mainframes.

Supercomputers are computers at the leading edge of data processing capability. Supercomputers are often a collection, grid or cluster of standard servers that comprise x86 or ARM processors. Supercomputers combine the computing power of multiple standard servers to execute high-performance computing. Such high-performance computing is used in solving complicated scientific and engineering problems.

Some of the advantages of supercomputers may include: the ability to focus processing power to execute a few programs or instructions as quickly as possible, and the ability to focus on speed and accelerated performance. Because of these advantages, supercomputers may extend the boundaries of hardware and software accomplishments.

Additionally, because supercomputers are comprised of multiple standard servers, in the event that a failure occurs, or maintenance is scheduled, on one or more of the server components, the supercomputer may remain operational. However, when a portion of the supercomputer is non-operational, the supercomputer may not operate at the same speed, or with the same amount of functions, as when it is fully operational.

Some of the disadvantages of supercomputers may include the large amount of energy and physical space required to operate a supercomputer. Additionally, building and maintaining a supercomputer is both resource consumptive and resource intensive.

Supercomputers are used in problems that require large amounts of computation for a single problem. Specifically, scientific problems, engineering problems, weather predictions and nuclear simulations are executed on supercomputers.

Computer farms, also referred to herein as server farms, may be group of servers that, together, offer greater computing capacity for a particular goal than an individual server. The server farm may or may not be clustered. An example of a server farm may be a web farm. A web farm may include multiple load-balanced web servers, where each of the web servers includes the same, or similar, or closely-related, content and configurations.

Computer clusters may be a group of loosely, or tightly, connected computers that work together, so that they can be viewed as a single system. One example of a computer cluster may be colloquially known as the cloud. The cloud may be a set of high-availability computers that may be accessed by one or more users for a plurality of related or unrelated computing tasks.

Therefore, it may be desirable to secure a system that is composed of multiple devices, computers and/or servers. It would be further desirable to secure such systems at the component level without disrupting the nature of the multi-component architecture.

SUMMARY OF THE DISCLOSURE

Apparatus and methods for a quantum-resilient server-cluster is provided. The server-cluster may include a plurality of silicon-based servers. Each silicon-based server may include a selectively-quantum-resilient case. The selectively-quantum-resilient case may include a silicon communications module. The silicon communications module may be operable to enable silicon-based communications between servers within the server-cluster. Silicon-based communications may also be referred to herein as silicon communications. The selectively-quantum-resilient case may include a quantum communications module operable to enable quantum-resilient communications between a silicon-based server included in the cluster and a server located outside of the server-cluster. Quantum-resilient communications may also be referred to herein as quantum communications.

The silicon communications between servers may be partially quantum-resilient. The silicon communications may be partially quantum-resilient because the communications are encased in a quantum case. The partially quantum-resilient communications may include quantum-tunneling, unencrypted communications between servers within the server-cluster. The partially quantum-resilient communications may include quantum-tunneling communications between servers. The partially quantum-resilient communications may include quantum-entanglement-verified communications between servers. The partially quantum-resilient communications may include non-quantum-random-number-generated encrypted communications between servers.

A silicon-based server, included in the server-cluster, may communicate through quantum communications, to a server located outside of the server-cluster.

The silicon communications between servers, within the server cluster, may be selectively quantum-resilient. The selectively-quantum-resilient case may include a quantum random number generator. The quantum random number generator may generate quantum-resilient random numbers. The generated quantum-resilient random number may be used by the quantum communications module to encrypt quantum communications. Such quantum communications may be transmitted between the silicon-based server, included in the server-cluster, and a server located outside of the server-cluster.

It should be appreciated that, the server-cluster may operate as a single server. Therefore, the server-cluster may have one input pipe and one output pipe. In other embodiments, the server-cluster may have more than one input pipe and more than one output pipe.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods for a quantum-resilient server-cluster is provided. The server-cluster may include a plurality of silicon-based servers. The server-cluster may operate as a single entity. Therefore, the server-cluster may have one input pipe and one output pipe.

Figure 1:
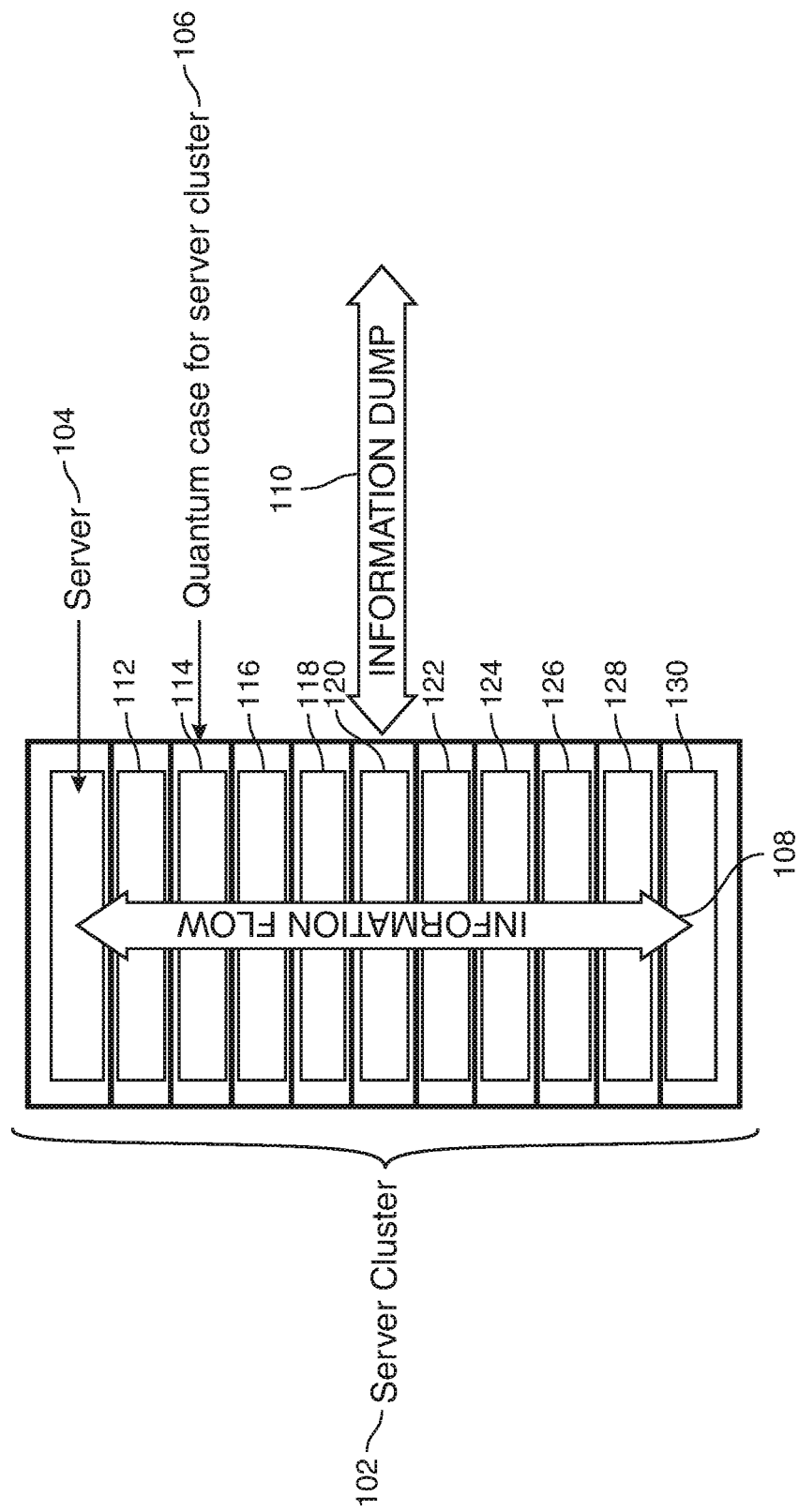
FIG. 1 shows an illustrative diagram in accordance with principles of the disclosure.

FIG. 1 shows an illustrative diagram in accordance with principles of the invention. Server-cluster 102 may include a plurality of servers. The plurality of servers may include server 104, server 112, server 114, server 116, server 118, server 120, server 122, server 124, server 126, server 128 and server 130.

Each of the servers may be encapsulated in its own quantum case. The quantum cases may be stacked one on top of another as shown at 106. Each quantum case may serve as a gatekeeper for information entering into the server and for information being transmitted from the server which the case encapsulates.

Each quantum case may enable non-quantum communications between the servers within the server-cluster. The non-quantum-resilient communications may be shown at 108. The non-quantum communications may include silicon communications or any other suitable communications. Each quantum case may disable non-quantum-resilient communications exiting the server-cluster. Disabling non-quantum-resilient communications exiting the server-cluster may protect the non-quantum-resilient communications from being open to quantum threats.

A quantum case may intercept non-quantum communications being transmitted from a server. The quantum case may protect the communication by encrypting the communication with a quantum-resilient random number. Upon encryption, the communication may be transmitted outside the case, as shown at 110. It should be appreciated that there may only be one output and one input into the server-cluster. Limiting the inputs to, and outputs from, the server-cluster may harden the security the server-cluster and enable the server-cluster to act as a single server.

Figure 2:
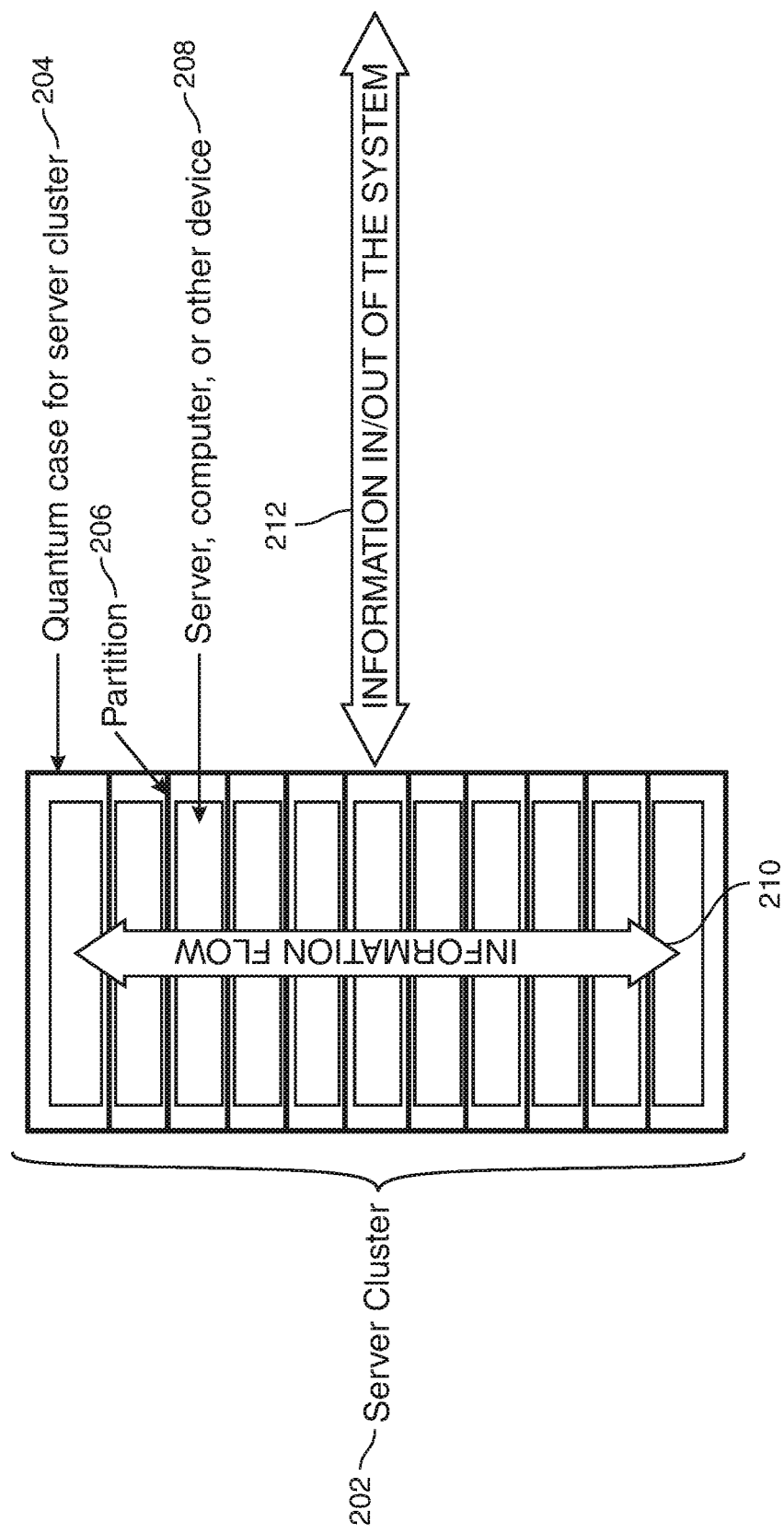
FIG. 2 shows another illustrative diagram in accordance with principles of the disclosure.

FIG. 2 shows another illustrative diagram. Server-cluster 202 may include a plurality of servers, computers or other devices, shown at 208. There may be a single quantum case that encapsulates the entire server cluster, as shown at 204.

Each server, computer or other devices, shown at 208, may be separated from the other devices in the server-cluster using a partition, shown at 206. The partition may act as a barrier. The partitions may enable non-quantum-resilient information flow between the servers, computers or other devices, as shown at 210.

The quantum case, shown at 204, may encrypt the communications going outside of the server-cluster with quantum-resilient properties. Such properties may include encryption using a quantum-resilient random number or any other suitable quantum properties. The quantum case may transmit the quantum-resilient communication to a location outside of the server-cluster, as shown at 212.

The quantum case may also serve as a gatekeeper for all communications coming into the server-cluster. The quantum case may decrypt any incoming communications that have been encrypted using a quantum-resilient encryption method.

Figure 3:
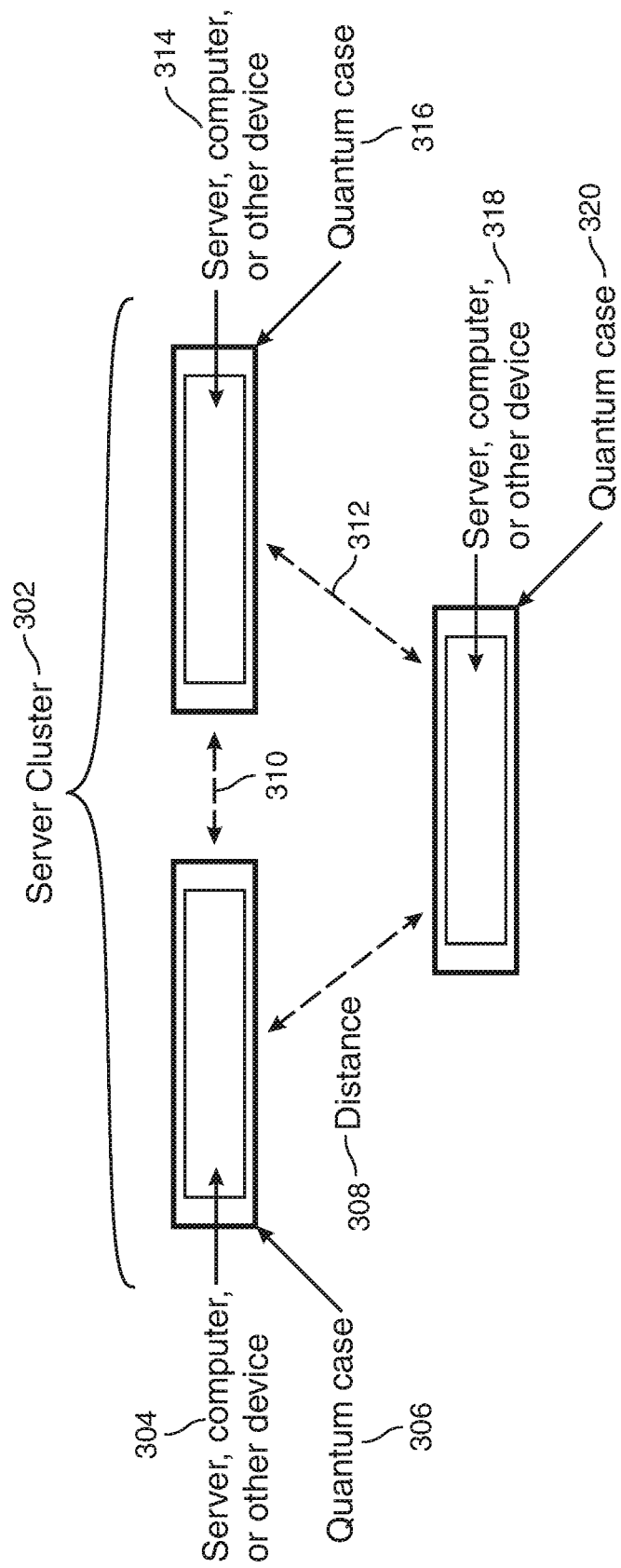
FIG. 3 shows yet another illustrative diagram in accordance with principles of the disclosure.

FIG. 3 shows another illustrative diagram. Server-cluster 302 may include server, computer or other device 304, server, computer or other device 314 and server, computer of other device 318.

Device 304 may be encapsulated with quantum case 306. Device 314 may be encapsulated in quantum case 316. Device 318 may be encapsulated in quantum case 320. Device 314 may be encapsulated in case 316. Device 318 may be encapsulated in case 320.

Cases 306, 316 and 320 may leverage the physical phenomenon of quantum entanglement, in which a quantum computing element included in a case may be synchronized with the other cases. Entangled particles of each case may remain connected so that actions performed on one affect the other, even when separated by certain distances. As such, cases 306, 316 and 320 may be in communication even though they are physically separated as shown at distances 308, 310 and 312.

Each silicon-based server may be separated from the other silicon-based servers by a selectively-quantum-resilient physical partition. The selectively-quantum-resilient physical partition may be selectable between a silicon-based communication between the servers and between a quantum-based communication between the servers.

Each silicon-based server may include the selectively-quantum-resilient partition. The selectively-quantum-resilient partition may include a quantum entanglement module. The quantum entanglement module may be operable to enable synchronization between servers located within the partition.

Quantum entanglement may be a quantum property in which two or more particles physically interact with one another. The physical interactions may be a result of particle generation, particle interaction, or particle sharing of spatial proximity. Once particles have become entangled, the actions of one particle affect the other particle even when separated at great distances. Therefore, the quantum state of each entangled particle cannot be described independently of the state of the other.

Measurements of quantum physical properties may be performed on a quantum particle, or group of entangled particles. Examples of quantum physical properties may include position, momentum, spin and polarization. Measurements of quantum physical properties, when performed on entangled particles, have been determined to be perfectly correlated. Therefore, from the measurements of a first particle, one can determine the measurements of a second particle with which the first particle is entangled.

Additionally, if two particles become disentangled, the particles are no longer synchronized. The physical phenomenon of quantum entanglement and quantum disentanglement can be harnessed to harden the security of communications between the servers, within the server-cluster.

Specifically, the quantum entanglement module included in each selectively-quantum-resilient partition may be entangled with one or more quantum entanglement modules, included in the selectively-quantum-resilient partitions, of the other servers. The quantum entanglement modules may be configured to remain entangled unless corrupted or tampered. The tampering may be a result of external tampering.

If a first quantum entanglement module determines that is has become disentangled from a second quantum entanglement module, the first quantum entanglement module may determine that the server or partition, with which the second quantum entanglement module is associated, may be compromised. Therefore, the server or partition, with which the second quantum entanglement module is associated, may be quarantined. The first quantum entanglement module may transmit a message to the remaining servers and/or partitions, within the cluster, indicating a quarantined state of the second quantum entanglement module.

The server or partition associated with the second quantum entanglement module may remain in a quarantined state until execution of a system reconfiguration or system cleaning. The system reconfiguration or system cleaning may include reverting the system compromise and re-entangling the second quantum entanglement module with the other entanglement modules. In some embodiments, the system reconfiguration or system cleaning may be initiated by the server or partition that instigated the quarantine state.

The selectively-quantum-resilient partition, associated with a quantum entanglement module, may halt communication between servers upon the indication of disentanglement from one or more quantum entanglement modules. The communication halt may be a total communication halt, where all communications between all servers in the server-cluster are stopped. The communication halt may be a partial communication halt where a portion of the communications between the servers are stopped. Such a partial communication halt may between servers that include quantum entanglement modules that have become disentangled.

The selectively-quantum-resilient partition may comprise a silicon communications module. The silicon communications module may enable silicon communications between servers. For the purposes of this application, silicon communications may be understood to mean communications that are transmitted between silicon computers. Silicon communications may not be secure against a portion of quantum-computer-based threats.

The selectively-quantum-resilient partition may include a quantum communications module. The quantum communications module may be operable to enable quantum communications between a silicon-based server, included in the server-cluster and a server located outside of the server cluster. For the purposes of this application, quantum communications may be understood to mean communications that are protected from quantum-based-computing threats and from conventional threats.

The quantum communications module may include a quantum random number generator. Quantum random number generation is a method of using quantum physics to generate true random numbers. Random number generation is a method or system for generating a sequence of numbers or symbols that cannot be reasonably predicted better than by chance. Because classical computers are mostly deterministic—i.e., can be determined with a high probability, it is difficult to generate random numbers using classical computers. Typical random number generators used by classical computers are pseudo-random number generators, which means that an algorithm is used to generate the pseudo-random numbers by collecting randomness from various low-entropy input streams. These pseudo-random numbers are hard to be predicted by a human. However, these pseudo-random numbers may be predicted by a large effort from multiple classical computers. The identification of the pseudo-random numbers is of great importance because random numbers are, in many applications, used to generate the keys to cryptography systems. The ability to predict a pseudo-random number undermines the security of the systems secured by the pseudo-random number. Quantum random number generation generates true random numbers. These true random numbers are unable to be identified using quantum computers, which is essential for securing a post-quantum computing era.

The quantum random number generator may be a random number generator that uses quantum technology to generate true random numbers as opposed to pseudo-random numbers. The quantum communications module included in the partition may generate a quantum-resilient random number. The quantum communications module may then use the generated quantum-resilient random number to encrypt the intercepted communication using the quantum tunneling properties, described below.

The quantum communications module may include quantum tunneling properties. Quantum-tunneling effect is a property of quantum physics. Quantum-tunneling enables a particle to pass through a physical barrier even if it does not have enough energy to go over the barrier. The passing through effect, or the tunneling effect, enables particles to possibly penetrate the physical barrier. A particle is more or less probable to pass through the physical barrier based on one or more criteria. The criteria include the size of the particle and the thickness of the physical barrier. A smaller particle is more probable to pass through a physical barrier, and a thinner barrier is a more likely conduit for the passing through of a particle.

Quantum-tunneling may be the quantum property in which a charge or wave, such as the flow of electrons, passes through a material that it could usually not pass through. Electrical charge does not usually travel well through an insulating material such as silicon. However, using quantum-tunneling technology, a flow of electrons may be pushed through an insulating material. Communications transmitted from a server-cluster may be considered a flow of electrons. Perforce, the quantum communications module may serve two or more purposes. Firstly, the quantum communications module may prevent any communications, transmitted from a server, included in the server-cluster, and intercepted at the server-cluster, from passing beyond the partition. Secondly, the partition may be able to push communications outside the server-cluster, to another server and/or the public internet, upon a command or other status change initiated by the partition.

It should be appreciated that, protecting communications from quantum-based threats may be both resource-intensive and resource-consumptive. Therefore, encapsulating each server, within a server-cluster with a selectively-quantum-resilient partition, enables silicon communications between servers and to ensures that communications with external devices are quantum-resilient. Such a server-cluster may provide the security settings required when communicating in a quantum-threat-enabled computing realm. However, such a server-cluster may also enable low-resource, non-quantum-resilient, communications between servers in order to conserve resources.

Therefore, a default setting of the internal communications within the server-cluster may be silicon communications. However, in the event of a system compromise, the internal communications can be changed from silicon communications to quantum communications in order to secure the internal communications. After a predetermined amount of time after a repair of the system compromise, the communications may revert back to silicon communications.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for a quantum-resilient computer cluster have been provided. Persons skilled in the art will appreciate that the present invention can be practiced by other than the described embodiments, which are presented for purposes of illustration rather than of limitation.

What is claimed is:

1. A method for operating a quantum-resilient server-cluster, the quantum-resilient server-cluster comprising a plurality of servers, each of the plurality of servers being encapsulated in a selectively-quantum-resilient case, the method comprising:
   transmitting a first communication from a first server, included in the quantum-resilient server-cluster;
   intercepting the first communication at a first selectively-quantum-resilient case;
   identifying, at the first selectively-quantum-resilient case, a recipient of the first communication;
   when the recipient of the first communication is a server included in the quantum-resilient server-cluster, the method further comprises the first selectively-quantum-resilient case:
      verifying security of the first communication via quantum entanglement; and
      transmitting the first communication to the recipient, in an unencrypted manner, via quantum-tunneling;
   when the recipient of the first communication is a server outside of the quantum-resilient server-cluster, the method further comprises the first selectively-quantum-resilient case:
      generating a quantum-resilient random number;
      encrypting the first communication with the generated random number; and transmitting the first communication to the recipient via quantum-tunneling.

2. The method of claim 1, wherein the quantum-resilient server-cluster comprises one input module and one output module.

3. The method of claim 2, wherein all communications received at the quantum-resilient server-cluster are received at the one input module and then directed to a server, included in the quantum-resilient server-cluster.

4. The method of claim 2, wherein all communications transmitted from the quantum-resilient server-cluster are transmitted from the one output module.

5. The method of claim 1, wherein, the verifying the security of the first communication via quantum entanglement comprises identifying that the first server and the recipient are in a state of quantum entanglement.

* * * * *